(12) United States Patent
Cook (10) Patent No.: US 12,447,933 B2
(45) Date of Patent: Oct. 21, 2025

(54) CHAIN OR BELT DRIVE LOCK

(71) Applicant: Vincent C. Cook, Ossining, NY (US)

(72) Inventor: Vincent C. Cook, Ossining, NY (US)

( * ) Notice: Subject to any disclaimer, the term of this patent is extended or adjusted under 35 U.S.C. 154(b) by 540 days.

(21) Appl. No.: 17/821,013

(22) Filed: Aug. 19, 2022

(65) Prior Publication Data

US 2023/0058865 A1    Feb. 23, 2023

Related U.S. Application Data

(60) Provisional application No. 63/260,411, filed on Aug. 19, 2021.

(51) Int. Cl.
*B66B 7/06* (2006.01)
*B60T 3/00* (2006.01)

(52) U.S. Cl.
CPC ..................................... *B60T 3/00* (2013.01)

(58) Field of Classification Search
CPC .......................................................... B60T 3/00
USPC .................. 188/4 R, 31, 32, 82.8, 82.84; 474/119–122, 214
See application file for complete search history.

(56) References Cited

U.S. PATENT DOCUMENTS

| | | | |
|---|---|---|---|
| 3,664,466 A * | 5/1972 | Rotheiser | B60T 3/00 188/32 |
| 3,996,808 A | 12/1976 | Zollman | |
| 4,019,354 A | 4/1977 | O'Dell | |
| 4,524,591 A | 6/1985 | Lanka | |
| 4,549,417 A | 10/1985 | Rivera | |
| 5,683,057 A | 11/1997 | Gangemi | |
| 7,343,728 B1 | 3/2008 | Cundari | |
| 9,003,893 B2 | 4/2015 | Tilley | |
| 9,126,775 B2 | 9/2015 | Brooks et al. | |
| 10,421,638 B2 | 9/2019 | Curl et al. | |

* cited by examiner

*Primary Examiner* — Christopher P Schwartz
(74) *Attorney, Agent, or Firm* — Stinson LLP (57) ABSTRACT

A drive lock for locking a roller chain or belt drive system to stop rotation of both the driver, such as a motor, and driven assembly, such as a wheel. By stopping rotation, the drive lock permits maintenance to be performed while the driver and driven system remain stationary, reducing the risk of damage to the drive system. The drive lock utilizes torque generated by pulley rotation to positively lock the roller chain/belt and pulley thereby preventing rotation in the direction the torque is applied.

16 Claims, 11 Drawing Sheets

CHAIN OR BELT DRIVE LOCK

CROSS-REFERENCE TO RELATED APPLICATION

The present application claims priority to U.S. Provisional Patent App. No. 63/260,411 filed Aug. 19, 2021, which is hereby incorporated by reference in its entirety.

FIELD

The present disclosure generally relates to a locking mechanism for preventing rotation of a belt or chain drive system.

BACKGROUND

When a roller chain or belt drive system needs maintenance, the drive system has to be locked down. Often no mechanism exists within the assembly to prevent the drive system from rotating. Mechanics may use inappropriate and unsafe methods to prevent the drive system from rotating and can damage the chain/belt or sprocket. For example, the force generated can bend or deform the interface between the sprocket and roller chain/belt. Such methods can result in drive system damage and unsafe worker conditions, as the locking of the drive system can easily become inadvertently unlocked and allow the drive system to rotate.

SUMMARY

In one aspect, a drive lock is for use with a chain or belt drive system including a pulley and a chain or belt. The drive lock comprises a pulley interface configured to engage the pulley. The pulley interface includes at least one pulley engagement protrusion configured to be received by the pulley when the pulley interface is engaged with the pulley. The drive lock includes a chain or belt interface configured to engage the chain or belt. The chain or belt interface includes at least one chain or belt engagement protrusion configured to be received by the chain or belt when the chain or belt interface is engaged with the chain or belt. The pulley interface and chain or belt interface are arranged with respect to each other to cause the drive lock to act as a wedge between the pulley and chain or belt to obstruct movement of the pulley and chain or belt when the pulley interface is engaged with the pulley and the chain or belt interface is engaged with the chain or belt.

In another aspect, a drive lock is for use with a chain or belt drive system including a pulley and a chain or belt. The drive lock comprises a pulley interface configured to engage the pulley. The drive lock comprises a chain or belt interface configured to engage the chain or belt. The chain or belt interface includes at least one chain or belt engagement protrusion configured to be received by the chain or belt when the chain or belt interface is engaged with the chain or belt. The chain or belt interface includes side walls configured to straddle the chain or belt when the chain or belt interface is engaged with the chain or belt. The pulley interface and chain or belt interface are arranged with respect to each other to cause the drive lock to act as a wedge between the pulley and chain or belt to obstruct movement of the pulley and chain or belt when the pulley interface is engaged with the pulley and the chain or belt interface is engaged with the chain or belt.

In another aspect, a drive lock for use with a chain or belt drive system includes a pulley and a chain or belt. The drive lock comprises a pulley interface configured to engage the pulley. The drive lock comprises a chain or belt interface configured to engage the chain or belt. The chain or belt interface includes at least one chain or belt engagement protrusion configured to be received by the chain or belt when the chain or belt interface is engaged with the chain or belt, and the chain or belt interface including side walls configured to straddle the chain or belt when the chain or belt interface is engaged with the chain or belt. The pulley interface and chain or belt interface are arranged with respect to each other to cause the drive lock to act as a wedge between the pulley and chain or belt to obstruct movement of the pulley and chain or belt when the pulley interface is engaged with the pulley and the chain or belt interface is engaged with the chain or belt.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

A drive lock, indicated generally be reference number 10, locks a roller chain or belt drive system to stop rotation of both the driver, such as a motor, and driven assembly, such as a wheel. By stopping rotation, the drive lock 10 permits maintenance to be performed while the driver and driven system remain stationary, reducing the risk of damage to the drive system. The drive lock utilizes the torque generated by pulley rotation to positively lock the roller chain/belt and pulley thereby preventing rotation in the direction the torque is applied. As will become apparent, the drive lock can be used on any roller chain or belt drive system.

Referring to FIGS. 1-4, the drive lock 10 has a modified wedge configuration and comprises a chain interface 30 and a sprocket interface 40 (broadly, "pulley interface"). Roller chain drive systems 12 have a driving sprocket and a driven sprocket. Sprockets can be referred to as pulleys. The drive lock 10 may be utilized on the driving or driven sprocket (broadly, "pulley") to accomplish the task of locking the chain drive system 12, such as a motorcycle drive system.

The drive lock 10 includes the chain interface 30 and the sprocket interface 40, as will be explained in greater detail herein. The chain interface 30 utilizes teeth 34 (broadly, "protrusions"), like a sprocket, to positively engage the rollers of the roller chain 18. The sprocket interface 40 generally replicates a curved roller chain about a sprocket. The sprocket interface includes a pair of side walls 42 and a plurality of stops 44 (broadly, "protrusions") extending between the walls. The stops 44 define a plurality of sprocket interface recesses 46 therebetween. The stops and sprocket interface recesses are arcuately arranged to correspond to the curve of the sprocket 14. Sprocket teeth 16 of the driven assembly extend into the sprocket interface recesses 46 and engage the stops 44 to secure the drive lock to the driven assembly (e.g., sprocket).

The chain interface 30 includes side walls 32 (broadly, "skirts") parallel to the arrangement of teeth 34. The side walls define a channel 36 that receives the roller chain 18. The side walls 32 stabilize the drive lock from axially rotating out of phase between the roller chain 18 and sprocket 14. The side walls 32 are also a safety feature as they minimize the risk of injury for the operator from pinching between the drive lock and the roller chain/belt during installation.

To use the drive lock 10, first the chain interface 30 is positioned along the chain by inserting the teeth into a section of the chain. The drive lock is positioned on the inner or sprocket side of the chain so that the drive lock will engage the sprocket.

Figure 1:
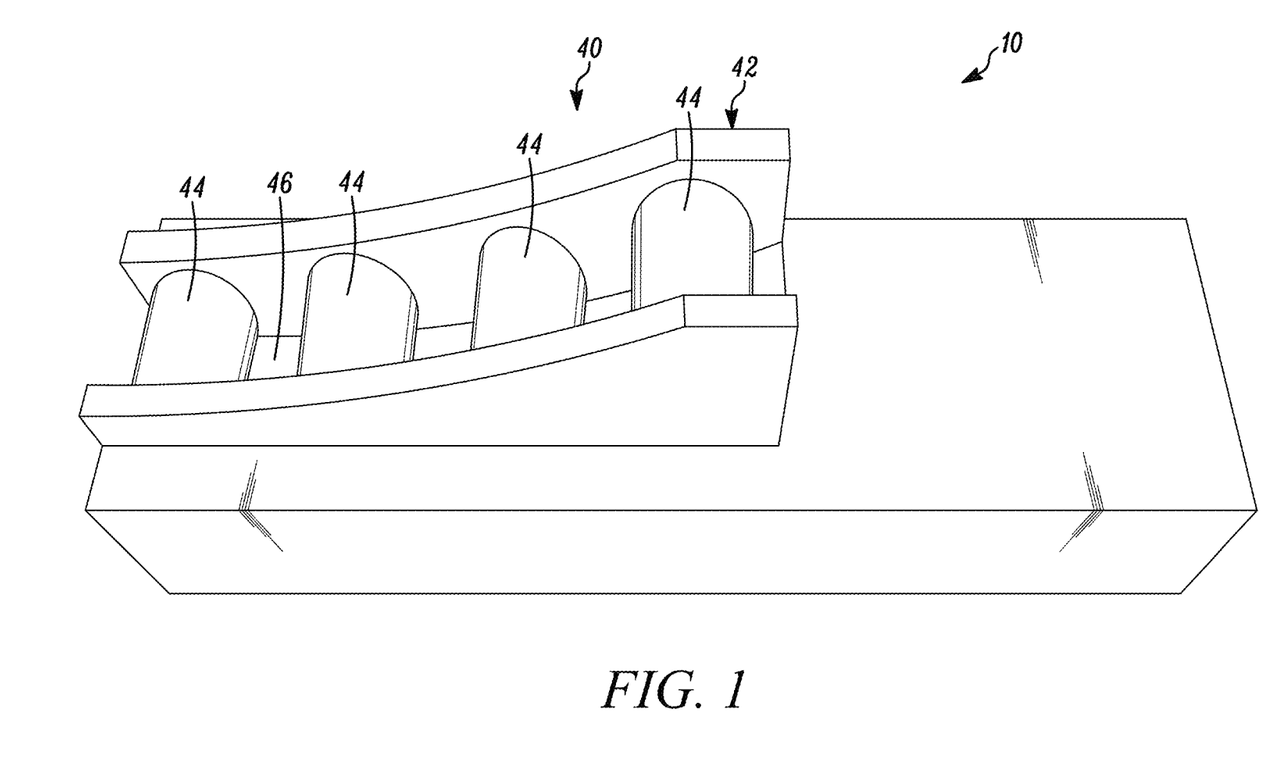
FIG. 1 is a top perspective of a drive lock of the present disclosure showing a chain interface of the drive lock.
Figure 2:
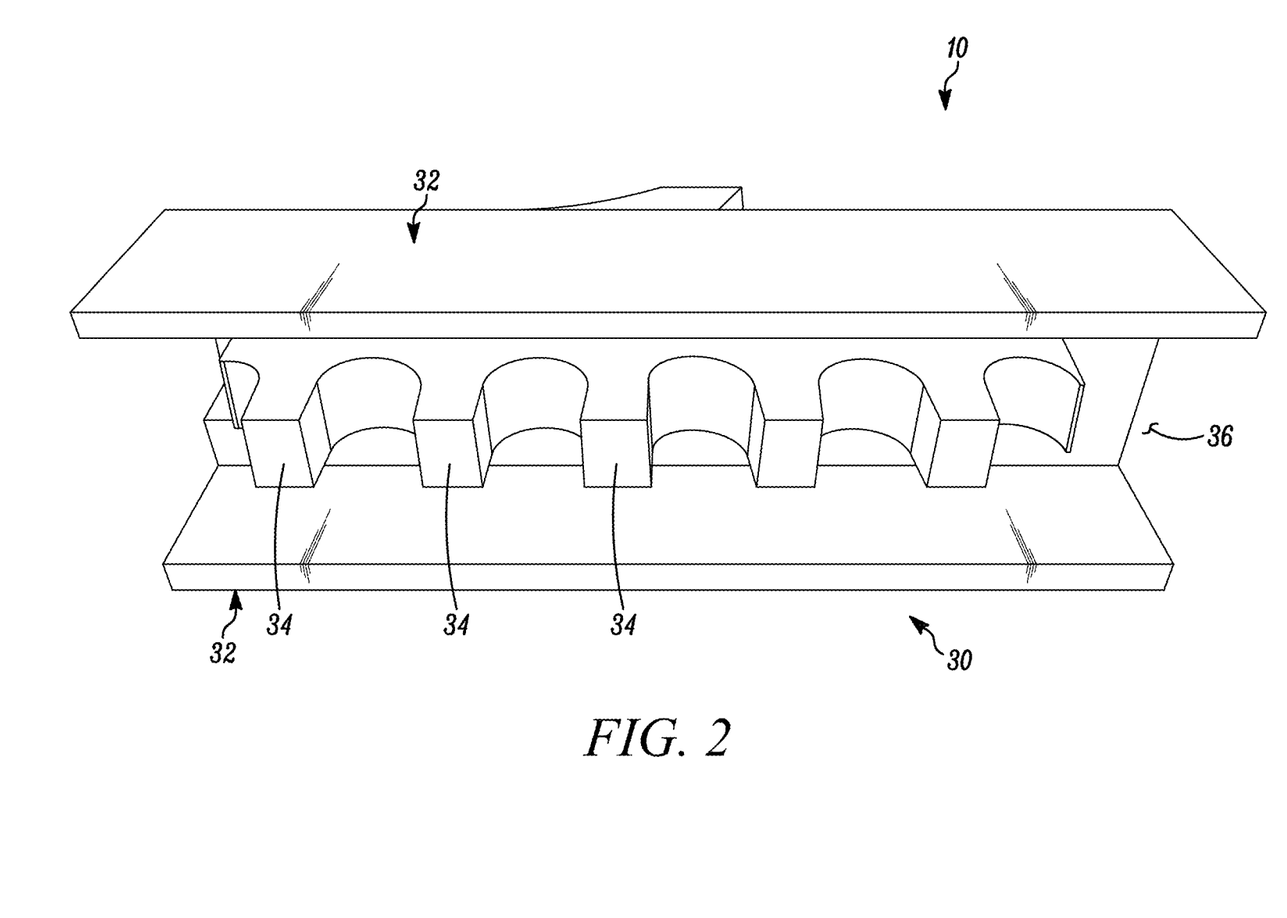
FIG. 2 is a bottom perspective the drive lock of FIG. 1 showing a chain interface of the drive lock.
Figure 3:
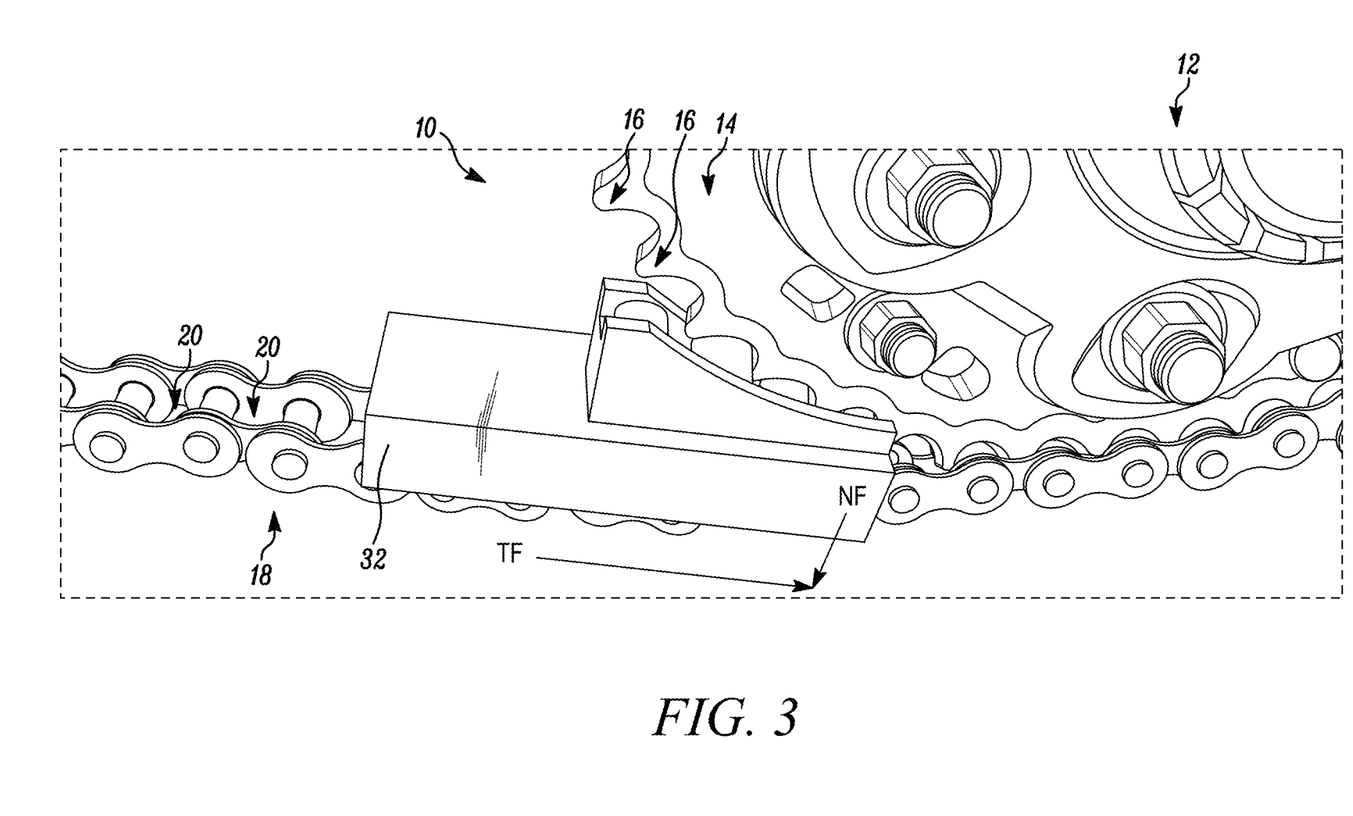
FIG. 3 is a perspective of the drive lock installed on a drive chain assembly in a counter-clockwise direction.

When installed, the drive lock 10 unitizes the drive system (e.g., the roller chain and the sprocket) to prevent rotation of the drive assembly. FIG. 3 illustrates the drive lock placed on the roller chain to prevent movement of the driver, drive assembly, and/or drive system that would result in the sprocket rotating in a counter clockwise direction. In this position, the roller chain and sprocket will not move when a torque is applied to the drive system in a clockwise direction. When the chain interface 30 is placed on the roller chain 18, the roller chain is disposed in the channel 36 and the teeth 34 are disposed in corresponding chain recesses 20 in the roller chain. The drive system is rotated to move the drive lock toward the sprocket. As the drive lock 10 is moved toward and engages the sprocket, the sprocket teeth 16 move into the sprocket interface recesses 46 of the sprocket interface 40 and engage the stops 44, preventing further motion between the chain and the sprocket to lock and unitize the drive system.

Referring to FIG. 3, as the drive lock 10 is fed into the interface between the roller chain 18 and the sprocket 14, the drive lock wedges between the chain and sprocket to prevent further rotation. A tangential force, indicated by arrow TF, on the roller chain is generated by the drive lock to prevent further rotation. As torque increases from the sprocket, the teeth of the drive lock increase their force against the roller chain, further securing the drive system in place.

The drive lock 10 converts the tangential force TF of the sprocket teeth 16 on the roller chain into a normal force, indicated by arrow marked NF. The tangential force TF is parallel to the direction of roller chain travel. The normal force NF is perpendicular to the direction or roller chain travel. Through this mechanism, the force generated by torqueing the driven sprocket feeds the drive lock 10 into the sprocket where the sprocket teeth 16 engage the sprocket interface 40. The tangential force TF being generated converts to a normal force NF. As the amount of torque on the driven system is increased, the tangential force TF also increases generating a larger normal force NF, thereby locking the drive system in place.

With reference to FIG. 3, to release the drive system and disengage the drive lock 10, the driven sprocket is rotated in the opposite direction (e.g., clockwise), thereby moving the drive lock with the roller chain away from the sprocket 14. Once clear of the driven sprocket, the drive lock can be removed from the roller chain.

Figure 4:
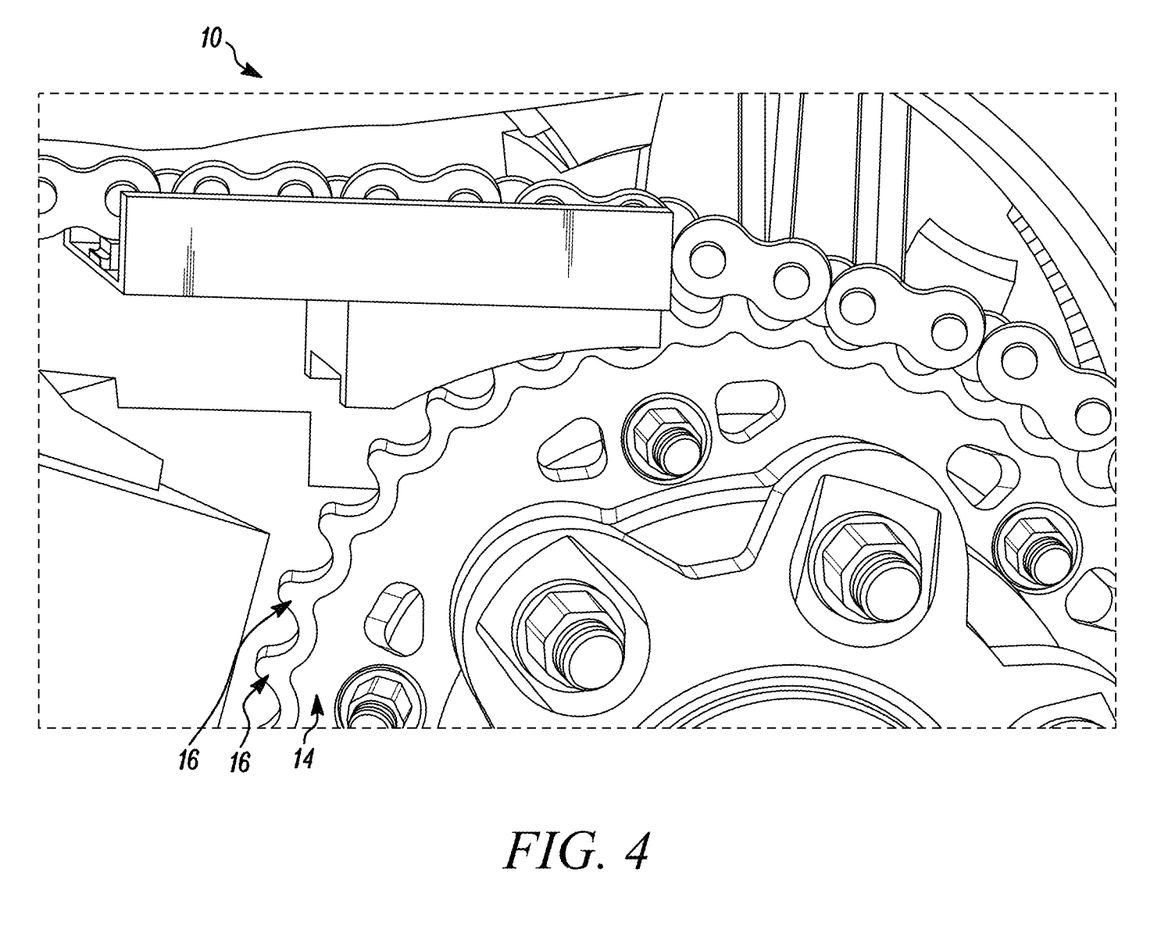
FIG. 4 is a perspective of the drive lock installed on a drive chain assembly in a clockwise direction.

Illustrated in FIG. 4, the drive lock 10 is placed to prevent movement of the driver, drive assembly, and/or drive system that would result in the sprocket rotating in a clockwise direction. In this position, the chain/belt and sprocket will not move when a torque is applied to the drive system in a clockwise direction.

The drive lock 10 can be easily modified to work with any roller chain drive, cog drive or other belt drive systems (e.g., with various types of toothed or non-toothed pulleys) by matching the engineering specifications for those systems. The following are general dimensions for the drive lock. The drive lock can be made from any suitable material such as metal (e.g., aluminum). It will be appreciated that the drive lock can have other configurations (e.g., lack side walls, teeth, stops, and/or protrusions) and have dimensions and/or proportions different from shown herein, without departing from the scope of the present disclosure.

In one example, the drive lock 10 is designed for a 530X roller chain drive on motorcycles. The teeth of the chain interface are compliant with ANSI standard 530 roller chain tooth profiles. The stops and recesses of the sprocket interface have ANSI compliant dimensions for 530X roller chain sprocket. For example, the sprocket interface can be designed for a 530X roller chain sprocket with an 8.375 inch diameter. This drive lock will work for any 530X drive system as long as there is space for implementation.

Figure 5:
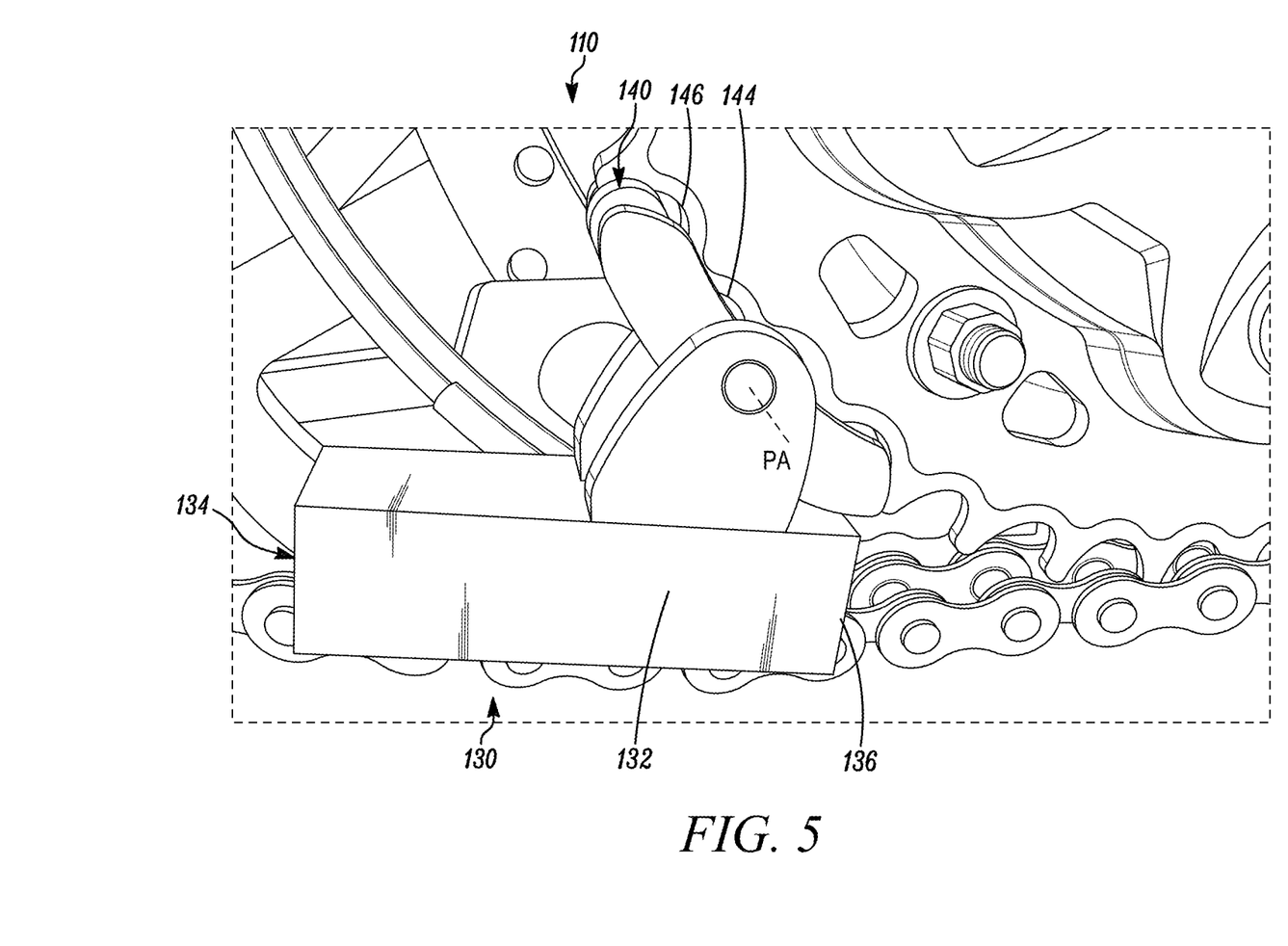
FIG. 5 is a perspective of another embodiment of a drive lock installed on a drive chain assembly.

A second embodiment of a drive lock 110 will be described with reference to FIG. 5. The drive lock 110 of this embodiment is similar to the drive lock 10 described above, and like reference numbers, plus 100, are used to designate like elements. For example, the drive lock 110 includes a chain interface 130 and a sprocket interface 140 (broadly, "pulley interface"). The chain interface includes side walls 132 (e.g., skirts) that define a channel 136 and teeth 134 arranged between the side walls. The sprocket interface 140 includes stops 144 and sprocket interface recesses 146 between the stops. In this embodiment, the sprocket interface 140 can pivot about a pivot axis PA relative to the chain interface 130. The pivoting enables the sprocket interface 140 to positively engage all of the sprocket teeth in the section of the sprocket that is engaged with the drive lock. This also enables equal force distribution on all of the stops of the sprocket interface, minimizing wear and tear.

Figure 6:
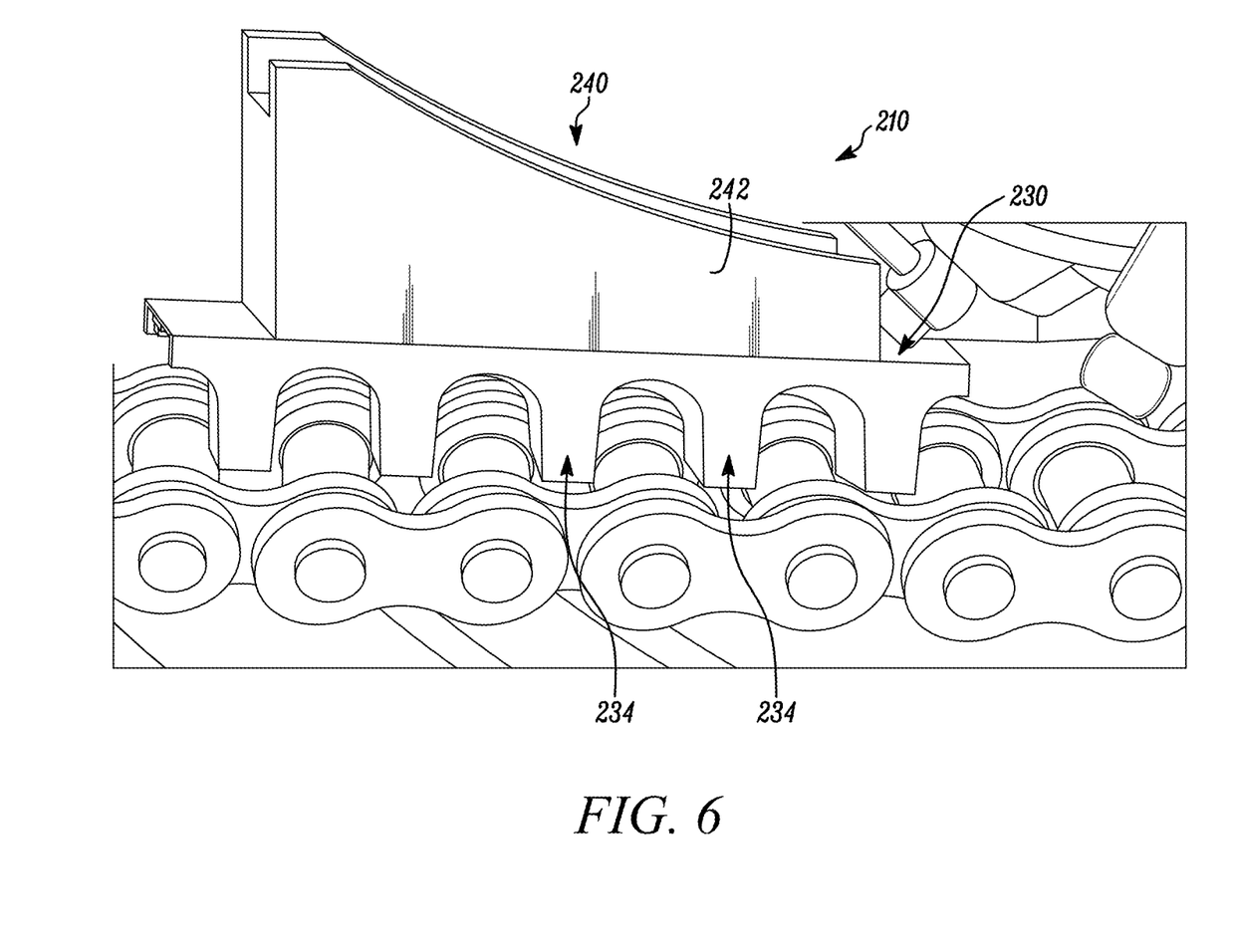
FIG. 6 is a perspective of a chain interface of another embodiment of a drive lock adjacent a drive chain assembly.
Figure 7:
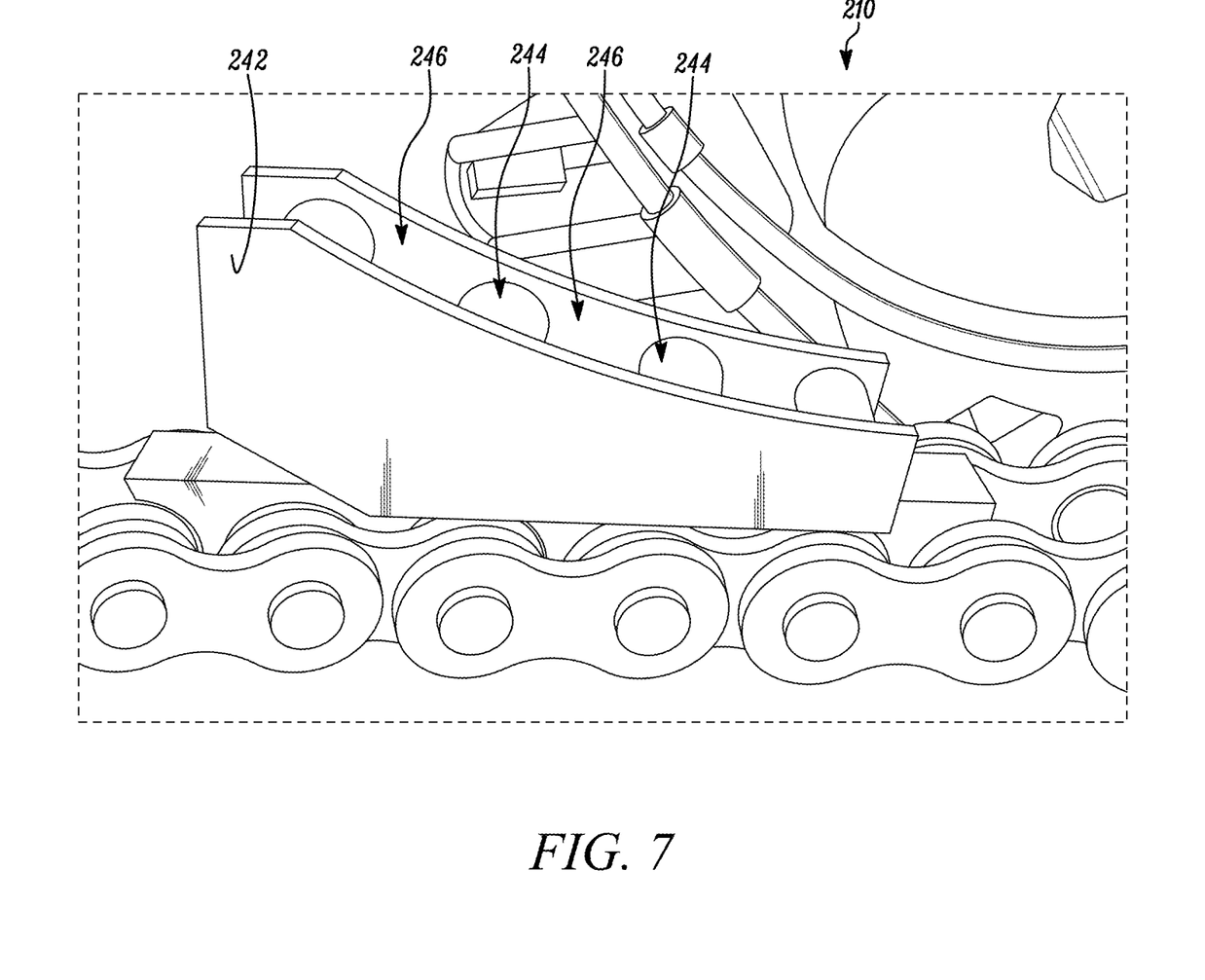
FIG. 7 is a perspective of the drive lock of FIG. 6 installed on a drive chain assembly.

A third embodiment of a drive lock 210 will be described with reference to FIGS. 6-7. The drive lock 210 of this embodiment is similar to the drive lock 10 described above, and like reference numbers, plus 200, are used to designate like elements. For example, the drive lock 210 includes a chain interface 230 and a sprocket interface 240 (broadly, "pulley interface"). The sprocket interface 240 includes side walls 242 and stops 244 extending between the side walls. Sprocket interface recesses 246 are located between the stops. The chain interface 230 includes teeth 234. In this embodiment, the chain interface 230 does not include sidewalls bounding the teeth 234.

Figure 8:
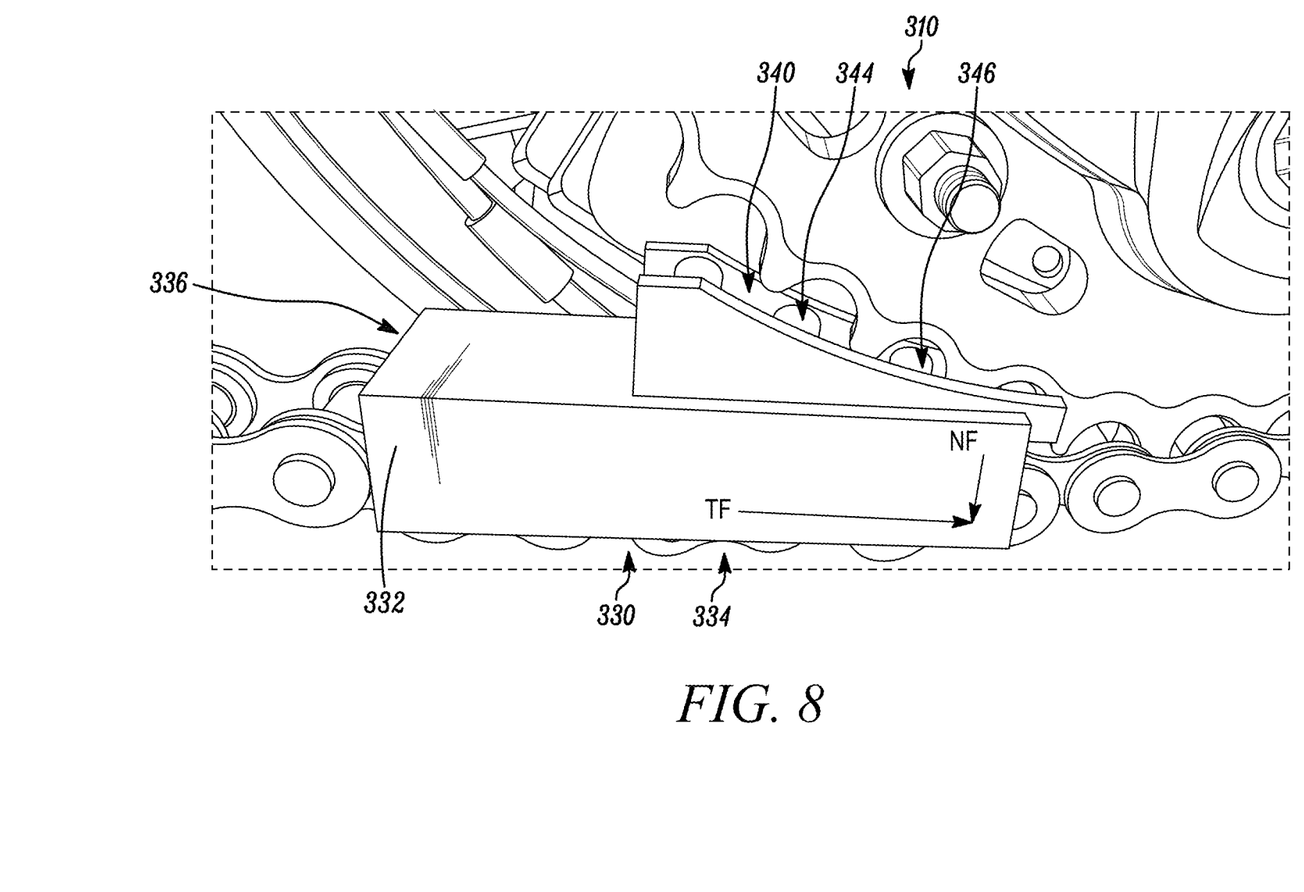
FIG. 8 is a perspective of another embodiment of a drive lock installed on a drive chain assembly.

A fourth embodiment of a drive lock 310 will be described with reference to FIG. 8. The drive lock 310 of this embodiment is similar to the drive lock 10 described above, and like reference numbers, plus 300, are used to designate like elements. For example, the drive lock 310 includes a chain interface 330 including side walls 332 that define a channel 336 and teeth 334 arranged between the side walls. The sprocket interface 340 (broadly, "pulley interface") includes stops 344 and sprocket interface recesses 346 between the stops. In this embodiment, the sprocket interface 340 does not include sidewalls bounding the stops.

Figure 9:
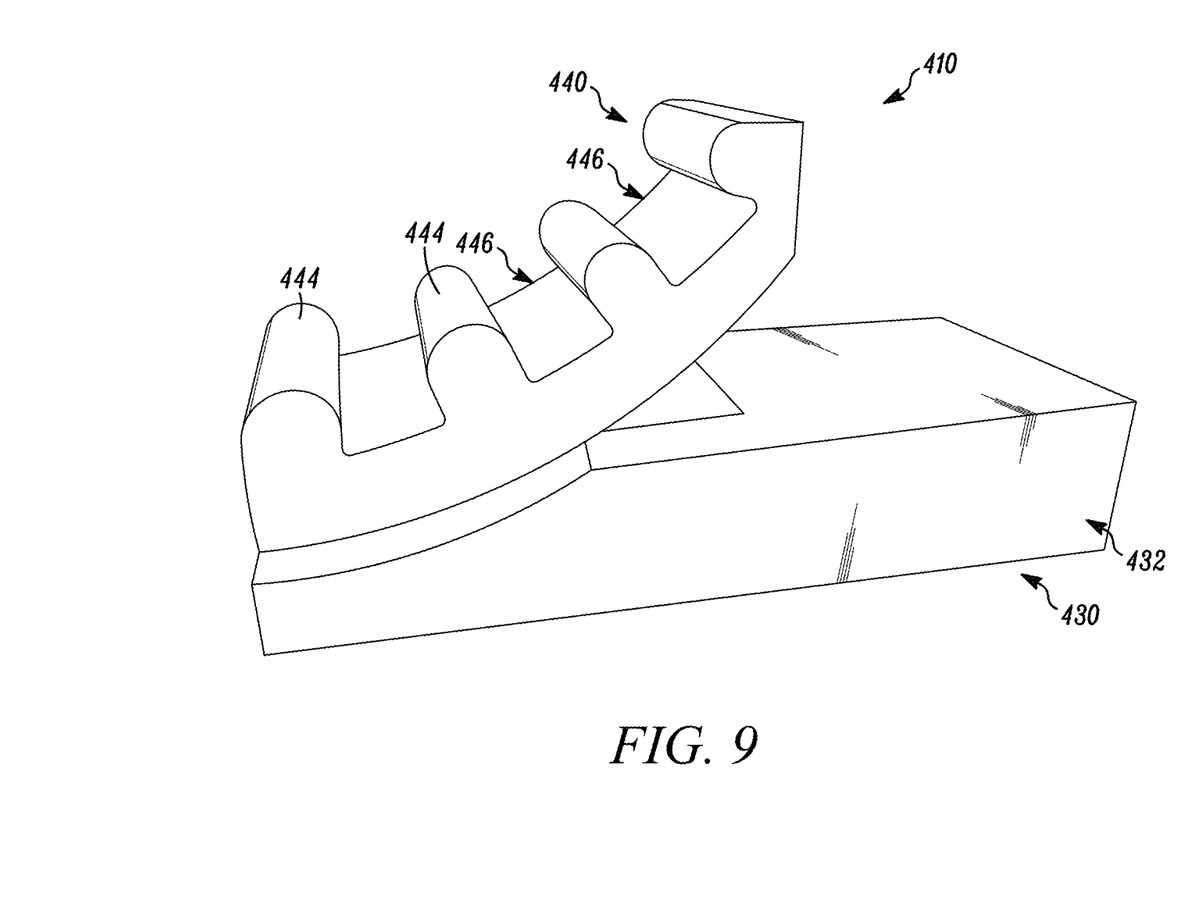
FIG. 9 is a top perspective of another embodiment of a drive lock.
Figure 10:
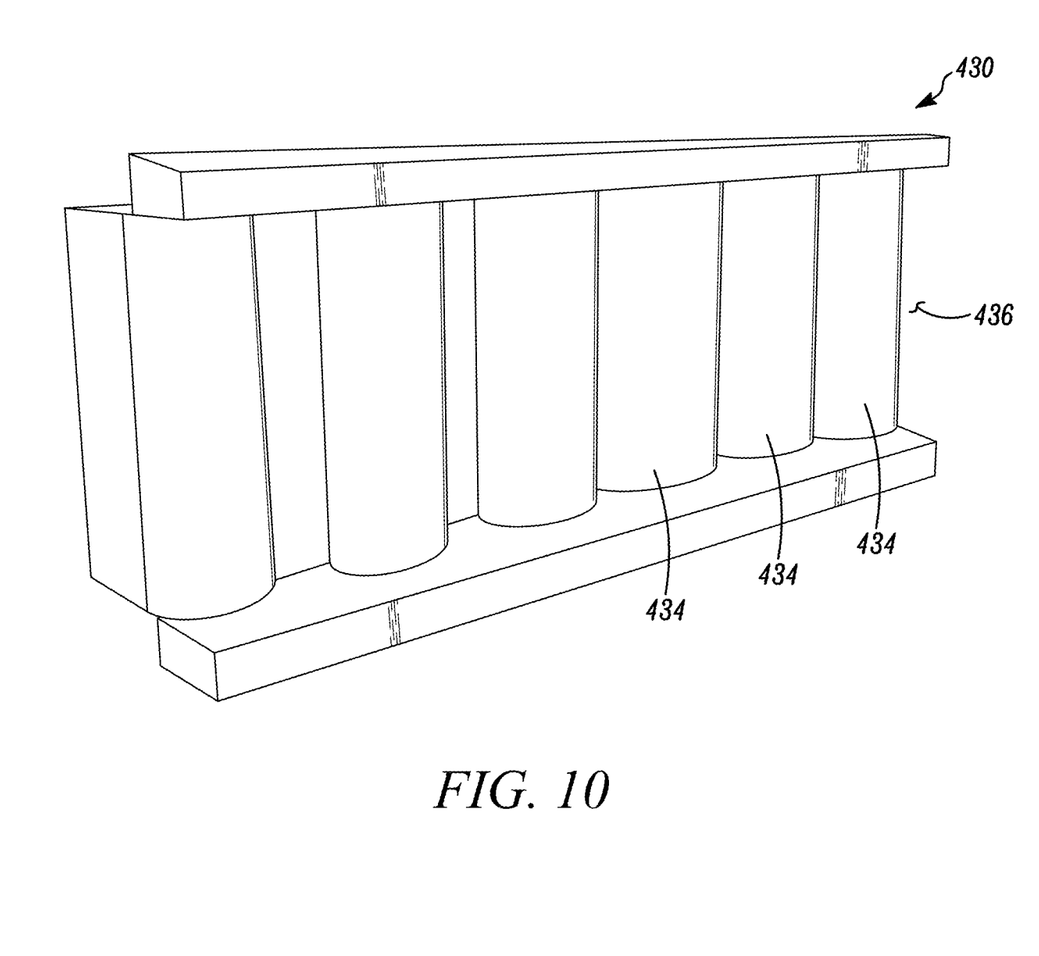
FIG. 10 is a bottom perspective of a belt interface of the drive lock of FIG. 9.
Figure 11:
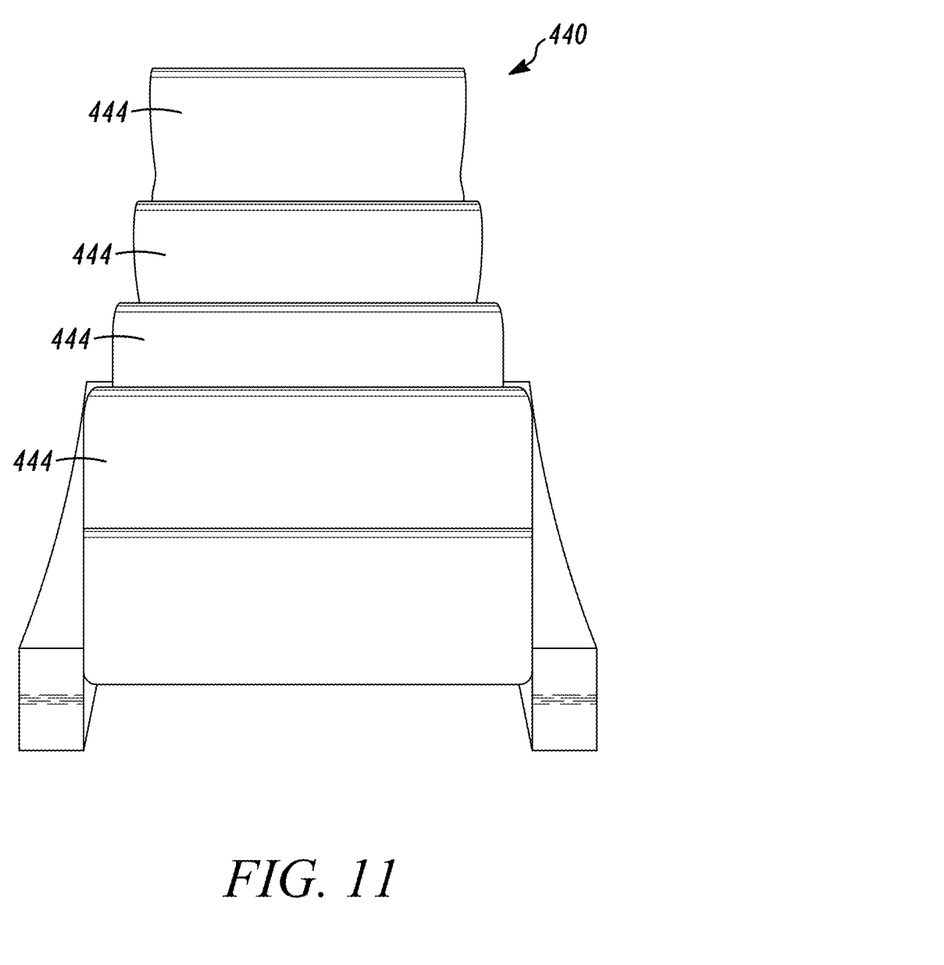
FIG. 11 is a front perspective of the drive lock of FIG. 9.

A fifth embodiment of a drive lock 410 will be described with reference to FIGS. 9-11. The drive lock 410 is similar to the drive lock 10 described above, and like reference numbers, plus 400, are used to designate like elements. In this embodiment, the drive lock 410 is configured for use with a cogged belt drive system. The drive lock 410 includes a belt interface 430 and a pulley interface 440 configured to engage a cogged pulley on which the cogged belt moves. The belt interface includes side walls 432 that define a channel 436 and teeth 434 arranged between the side walls. The pulley interface 440 includes stops 444 and pulley interface recesses 446 between the stops. In this embodiment, the pulley interface 440 does not include side walls bounding the stops. Such a construction may be desirable for use with a pulley that includes side walls and is configured to capture the protrusions of the pulley interface between the side walls of the pulley. However, the pulley interface could still include side walls.

It will be apparent that modifications and variations are possible without departing from the scope of the invention defined in the appended claims. The dimensions and proportions described herein are by way of example without limitation. Other dimensions and proportions can be used without departing from the scope of the present disclosure. Other configurations (e.g., including or not including side walls on the sprocket interface or chain/belt interface, and including or not including teeth, protrusions, stops, and/or recesses on the sprocket interface or chain/belt interface) can be used without departing from the present disclosure. Moreover, it will be appreciated that components of the embodiments disclosed above can be combined in various combinations (e.g., forming different sprocket and/or chain/belt interfaces) without departing from the scope of the present disclosure. It will be appreciated the embodiments disclosed herein to not require a component of the drive lock (e.g., a securing device) to be passed through the chain or to be wrapped around the chain/belt, but such components could be used without departing from the scope of the disclosure.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A drive lock for use with a chain or belt drive system including a pulley and a chain or belt, the drive lock comprising:
a pulley interface configured to engage the pulley, the pulley interface including at least one pulley engagement protrusion configured to be received by the pulley when the pulley interface is engaged with the pulley; and
a chain or belt interface configured to engage the chain or belt, the chain or belt interface including at least one chain or belt engagement protrusion configured to be received by the chain or belt when the chain or belt interface is engaged with the chain or belt;
wherein the pulley interface and chain or belt interface are arranged with respect to each other to cause the drive lock to act as a wedge between the pulley and chain or belt to obstruct movement of the pulley and chain or belt when the pulley interface is engaged with the pulley and the chain or belt interface is engaged with the chain or belt,
wherein the pulley interface is connected to the chain or belt interface by a pivot connection, the pulley interface being pivotable about the pivot connection with respect to the chain or belt interface.

2. The drive lock as set forth in claim 1, wherein the pulley engagement protrusion is a first pulley engagement protrusion, and the pulley interface comprises a second pulley engagement protrusion configured to be received by the pulley when the pulley interface is engaged with the pulley.

3. The drive lock as set forth in claim 1, wherein the pulley interface includes side walls configured to straddle the pulley when the pulley interface is engaged with the pulley.

4. The drive lock as set forth in claim 1, wherein the chain or belt engagement protrusion is a first chain or belt engagement protrusion, and the chain or belt interface includes a second chain or belt protrusion configured to be received by the chain or belt when the chain or belt interface is engaged with the chain or belt.

5. The drive lock as set forth in claim 1, wherein the chain or belt interface includes side walls configured to straddle the chain or belt when the chain or belt interface is engaged with the chain or belt.

6. The drive lock as set forth in claim 1, wherein the drive lock is free of a securing device moveable with respect to the chain or belt interface configured to secure the chain or belt interface to the chain or belt when the pulley interface is free of engagement with the pulley.

7. A drive lock for use with a chain or belt drive system including a pulley and a chain or belt, the drive lock comprising:
a pulley interface configured to engage the pulley, the pulley interface including at least one pulley engagement protrusion configured to be received by the pulley when the pulley interface is engaged with the pulley; and
a chain or belt interface configured to engage the chain or belt, the chain or belt interface including side walls configured to straddle the chain or belt when the chain or belt interface is engaged with the chain or belt;
wherein the pulley interface and chain or belt interface are arranged with respect to each other to cause the drive lock to act as a wedge between the pulley and chain or belt to obstruct movement of the pulley and chain or belt when the pulley interface is engaged with the pulley and the chain or belt interface is engaged with the chain or belt,
wherein the pulley interface is connected to the chain or belt interface by a pivot connection, the pulley interface being pivotable about the pivot connection with respect to the chain or belt interface.

8. The drive lock as set forth in claim 7, wherein the pulley engagement protrusion is a first pulley engagement protrusion, and the pulley interface comprises a second pulley engagement protrusion configured to be received by the pulley when the pulley interface is engaged with the pulley.

9. The drive lock as set forth in claim 7, wherein the pulley interface includes side walls configured to straddle the pulley when the pulley interface is engaged with the pulley.

10. The drive lock as set forth in claim 7, wherein the chain or belt interface includes multiple chain or belt engagement protrusions configured to be received by the chain or belt when the chain or belt interface is engaged with the chain or belt.

11. The drive lock as set forth in claim 7, wherein the drive lock is free of a securing device moveable with respect to the chain or belt interface configured to secure the chain or belt interface to the chain or belt when the pulley interface is free of engagement with the pulley.

12. A drive lock for use with a chain or belt drive system including a pulley and a chain or belt, the drive lock comprising:
   a pulley interface configured to engage the pulley; and
   a chain or belt interface configured to engage the chain or belt, the chain or belt interface including at least one chain or belt engagement protrusion configured to be received by the chain or belt when the chain or belt interface is engaged with the chain or belt, and the chain or belt interface including side walls configured to straddle the chain or belt when the chain or belt interface is engaged with the chain or belt;
   wherein the pulley interface and chain or belt interface are arranged with respect to each other to cause the drive lock to act as a wedge between the pulley and chain or belt to obstruct movement of the pulley and chain or belt when the pulley interface is engaged with the pulley and the chain or belt interface is engaged with the chain or belt,
   wherein the pulley interface is connected to the chain or belt interface by a pivot connection, the pulley interface being pivotable about the pivot connection with respect to the chain or belt interface.

13. The drive lock as set forth in claim 12, wherein the pulley interface includes at least one pulley engagement protrusion configured to be received by the pulley when the pulley interface is engaged with the pulley.

14. The drive lock as set forth in claim 12, wherein the pulley interface includes side walls configured to straddle the pulley when the pulley interface is engaged with the pulley.

15. The drive lock as set forth in claim 12, wherein the chain or belt engagement protrusion is a first chain or belt engagement protrusion, and the chain or belt interface includes a second chain or belt protrusion configured to be received by the chain or belt when the chain or belt interface is engaged with the chain or belt.

16. The drive lock as set forth in claim 12, wherein the drive lock is free of a securing device moveable with respect to the chain or belt interface configured to secure the chain or belt interface to the chain or belt when the pulley interface is free of engagement with the pulley.

\* \* \* \* \*